US011341777B2

(12) United States Patent
Wang et al.

(10) Patent No.: US 11,341,777 B2
(45) Date of Patent: May 24, 2022

(54) SYSTEM ARCHITECTURE AND METHOD OF AUTHENTICATING A USER

(71) Applicant: PURDUE RESEARCH FOUNDATION, West Lafayette, IN (US)

(72) Inventors: He Wang, West Lafayette, IN (US); Tinghan Yang, West Lafayette, IN (US); Yubo Shao, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/792,104

(22) Filed: Feb. 14, 2020

(65) Prior Publication Data

US 2020/0265215 A1 Aug. 20, 2020

Related U.S. Application Data

(60) Provisional application No. 62/805,529, filed on Feb. 14, 2019.

(51) Int. Cl.
*G06V 40/30* (2022.01)
*G06K 9/62* (2022.01)
(Continued)

(52) U.S. Cl.
CPC ............ *G06V 40/376* (2022.01); *G01S 7/539* (2013.01); *G06K 9/6232* (2013.01);
(Continued)

(58) Field of Classification Search
CPC .......... G06K 9/00154–00194; G06K 9/00174; G06K 9/00355; G06K 9/00181;
(Continued)

(56) References Cited

U.S. PATENT DOCUMENTS

| 2003/0233557 A1* | 12/2003 | Zimmerman | ...... G06K 9/00154 |
| | | | 713/186 |
| 2020/0234030 A1* | 7/2020 | Baheti | .................... B60R 25/252 |
| 2020/0309930 A1* | 10/2020 | Zhou | ....................... G01S 15/32 |

OTHER PUBLICATIONS

De Bruyne et al., "Authentication of handwritten signatures with SONAR" (published in Proceedings of the Third International Conference: Security Through Science and Engineering, pp. 169-172) (Year: 1980).*

(Continued)

*Primary Examiner* — Casey L Kretzer
(74) *Attorney, Agent, or Firm* — Purdue Research Foundation

(57) ABSTRACT

A non-transitory computer-readable medium encoded with a computer-readable program which, when executed by a first processor, will cause a computer to execute a method of authenticating a user, the method including training a plurality of models. The method additionally includes sending, by a computer, an acoustic signal. Further, the method includes receiving, by the computer, a reflected acoustic signal, wherein the reflected acoustic signal comprises information about a signature. Moreover, the method includes receiving, by the computer, motion data about the information about the signature. The method additionally includes comparing the information about the signature to a model to generate a score. Additionally, the method includes deciding, based on the score, if the information about the signature is within a predetermined tolerance level.

28 Claims, 9 Drawing Sheets

(51) Int. Cl.
   *G01S 7/539* (2006.01)
   *G06V 40/20* (2022.01)
(52) U.S. Cl.
   CPC .......... *G06K 9/6256* (2013.01); *G06V 40/28* (2022.01); *G06V 40/388* (2022.01); *G06V 40/394* (2022.01); *G06K 9/6269* (2013.01); *G06K 9/6276* (2013.01)
(58) Field of Classification Search
   CPC .. G06K 9/6232; G06K 9/6256; G06K 9/6269; G06K 9/6276; G06V 40/376; G06V 40/28; G06V 40/388; G06V 40/394; G01S 7/539
   See application file for complete search history.

(56) References Cited

OTHER PUBLICATIONS

Elovici, Y. et al., Handwritten Signature Verification Using Wrist-Worn Devices, Proc. ACM Interact. Mob. Wearable Ubiquitous Technol., 2, pp. 1-26, 2018.

Fang, Y. et al., A novel video-based system for in-air signature verification, Computers and Electrical Engineering, 57, pp. 1-14, 2017.

Huang, K. et al., Off-line signature verification based on geometric feature extraction and neural network classification, Pattern Recognition, 30, pp. 9-17, 1997.

Krinninger, S. et al., Online Signature Verification With Support Vector Machines Based on LCSS Kernel Functions, IEEE Transactions on Systems, Man, and Cybernetics-Part B: Cybernetics, 40, pp. 1088-1100, 2010.

Liu, A. X. et al., Device-Free Gesture Tracking Using Acoustic Signals, MobiCom '16: Proceedings of the 22nd Annual International Conference on Mobile Computing and Networking, pp. 82-94, 2016.

Rajagopalan, A. N. et al., Off-line signature verification using DTW, Pattern Recognition Letters, 28, pp. 1407-1414, 2007.

Ramos, D. et al., HMM-based on-line signature verification: Feature extraction and signature modeling, Pattern Recognition Letters, 28, pp. 2325-2334, 2007.

Sae-Bae, N. et al., Online Signature Verification on Mobile Devices, IEEE Transactions on Information Forensics and Security, 9, pp. 933-947, 2014.

Sharma, A. et al., On the Exploration of Information From the DTW Cost Matrix for Online Signature Verification, IEEE Transactions on Cybernetics, 48, pp. 611-624, 2018.

Sheffer, B. et al., Offline Signature Verification with Convolutional Neural Networks, Technical report, Stanford University, pp. 1-8, 2016.

Sundaram, S. et al., An enhanced contextual DTW based system for online signature verification using Vector Quantization, Pattern Recognition Letters, 84, pp. 22-28, 2016.

* cited by examiner

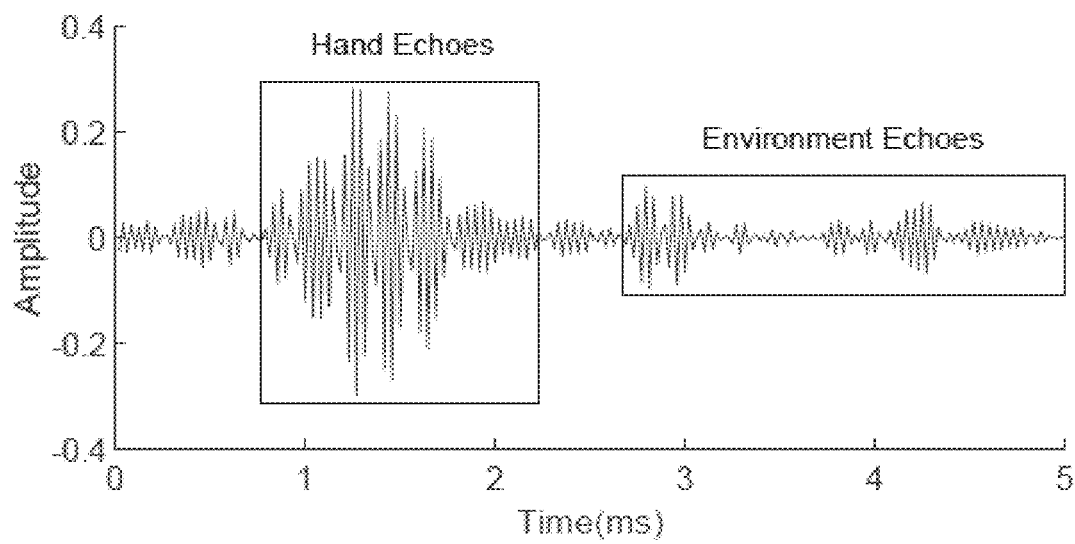
FIGURE 5
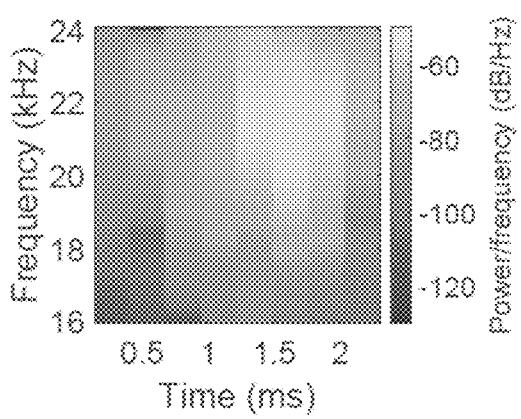 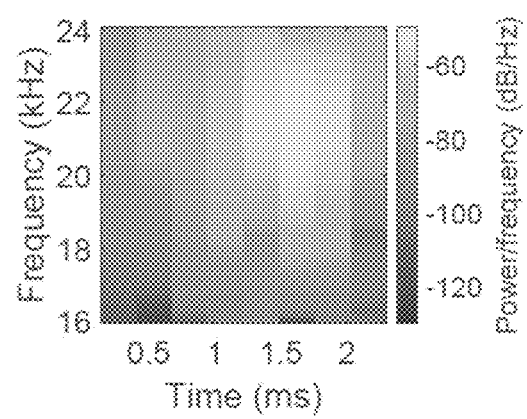
FIGURE 6(a)         FIGURE 6(b)

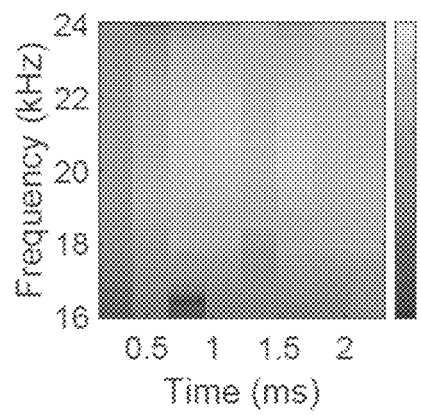 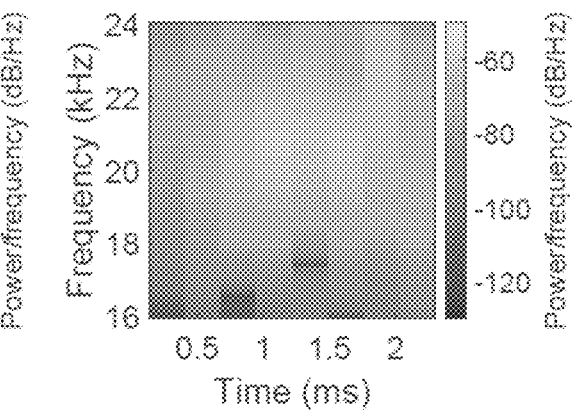
FIGURE 6(c)　　　　　　　FIGURE 6(d)
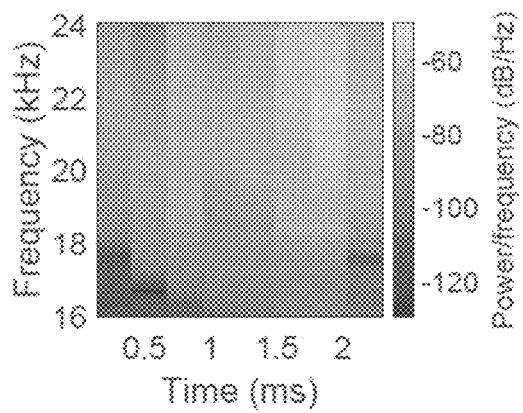 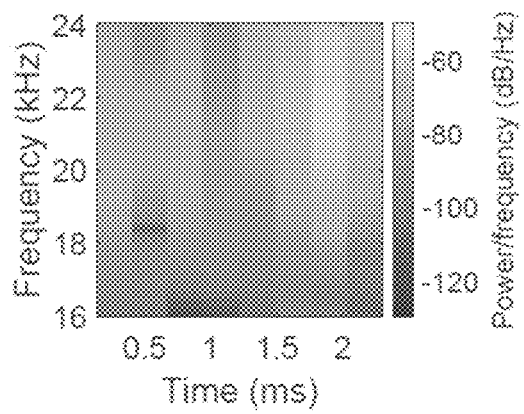
FIGURE 6(e)　　　　　　　FIGURE 6(f)

SYSTEM ARCHITECTURE AND METHOD OF AUTHENTICATING A USER

CROSS-REFERENCE TO RELATED APPLICATIONS

The present U.S. patent application is related to and claims the priority benefit of U.S. Provisional Patent Application Ser. No. 62/805,529, filed Feb. 14, 2019, the contents of which is hereby incorporated by reference in its entirety into this disclosure.

BACKGROUND

This section introduces aspects that may help facilitate a better understanding of the disclosure. Accordingly, these statements are to be read in this light and are not to be understood as admissions about what is or is not prior art.

Many user authentication technologies have been used in current smartphone products. Password authentication is the most ubiquitous one. However, considering that users need to login their mobile devices so many times, typing in a password multiple times can be inconvenient.

SUMMARY

One aspect of the present application relates to a non-transitory computer-readable medium encoded with a computer-readable program which, when executed by a first processor, will cause a computer to execute a method of authenticating a user, the method including training a plurality of models. The method additionally includes sending, by a computer, an acoustic signal. Further, the method includes receiving, by the computer, a reflected acoustic signal, wherein the reflected acoustic signal comprises information about a signature. Moreover, the method includes receiving, by the computer, motion data about the information about the signature. The method additionally includes comparing the information about the signature to a model to generate a score. Additionally, the method includes deciding, based on the score, if the information about the signature is within a predetermined tolerance level.

Another aspect of the present application relates to a non-transitory computer-readable medium encoded with a computer-readable program which, when executed by a first processor, will cause a computer to execute a method of authenticating a user, the method including sending, by a computer, an acoustic signal. The method also includes receiving, by the computer, a reflected acoustic signal, wherein the reflected acoustic signal comprises information about a signature. Additionally, the method includes receiving, by the computer, motion data about the information about the signature. Further, the method includes comparing the information about the signature to a model to generate a score. Furthermore, the method includes deciding, based on the score, if the information about the signature is within a predetermined tolerance level.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

FIG. 3($b$) illustrates receiver design in accordance with one or more embodiments.

FIG. 5 illustrates separation of hand echoes and environment echoes, in accordance with one or more embodiments.

FIG. 6($a$) illustrates a first spectrogram for User1 in accordance with one or more embodiments. FIG. 6($b$) illustrates a second spectrogram for User1 in accordance with one or more embodiments. FIG. 6($c$) illustrates a first spectrogram for User 2 in accordance with one or more embodiments. FIG. 6($d$) illustrates a second spectrogram for User2 in accordance with one or more embodiments. FIG. 6($e$) illustrates a first spectrogram for User3 in accordance with one or more embodiments. FIG. 6($f$) illustrates a second spectrogram for User3 in accordance with one or more embodiments.

FIG. 8($b$) illustrates a comparison of a motion sensor's data among a registered, a genuine, and a forged signature data, using a gyroscope sensor.

FIG. 10($b$) illustrates in-air signature classification for User 2.

DETAILED DESCRIPTION

Figure 1:
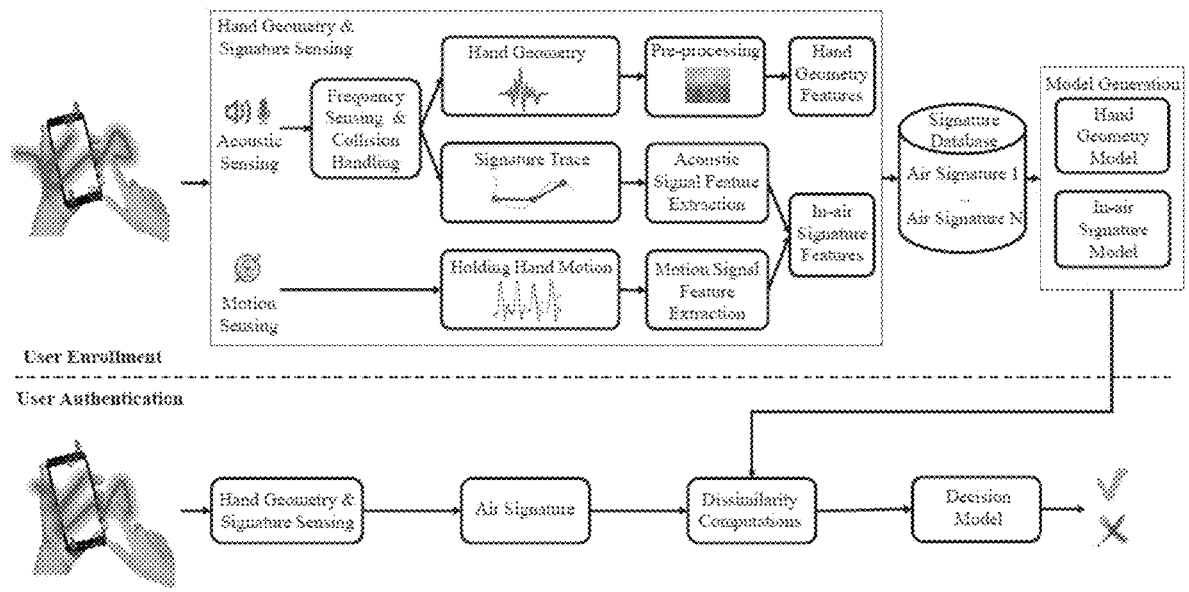
FIG. 1 illustrates an authentication software architecture in accordance with one or more embodiments.
Figure 2:
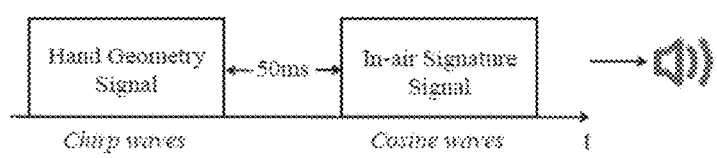
FIG. 2 illustrates sound signal design overview in accordance with one or more embodiments.

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Various embodiments of the present application relate to exploiting the motion sensors (accelerometer sensor and gyroscope sensor) to continuously capture the displacement and rotation of the device while users are signing. At the same time, acoustic signals will also be transmitted by smartphone speaker, travel through the air and be received by the smartphone microphones (top and bottom). Therefore, the information of finger displacement, velocity, acceleration and other features are acquired. Moreover, using all these features extracted by motion sensors and acoustic signals, we adopt the Dynamic Time Warping (DTW) method to calculate the distance cost between the registered signature data and the new signature. Users unlock their devices if the distance cost is less than a specific threshold.

Example 1

A non-transitory computer-readable medium encoded with a computer-readable program which, when executed by a first processor, will cause a computer to execute a method of authenticating a user, the method including training a plurality of models. The method additionally includes sending, by a computer, an acoustic signal. Further, the method includes receiving, by the computer, a reflected acoustic signal, wherein the reflected acoustic signal comprises information about a signature. Moreover, the method includes receiving, by the computer, motion data about the information about the signature. The method additionally includes comparing the information about the signature to a model to generate a score. Additionally, the method includes deciding, based on the score, if the information about the signature is within a predetermined tolerance level. In some embodiments, the acoustic signal is higher than 17000 Hz. In some embodiments, the information about the signature includes at least one of a hand geometry of the user; or a hand movement of the user.

The receiving, by the computer, the information about the signature includes receiving the hand geometry of the user. The receiving the hand geometry of the user further includes transforming the information about the signature using a spectrogram. Additionally, the receiving the hand geometry of the user includes providing the spectrogram into the model. The comparing the information about the signature to the model to generate the score, wherein the score includes a measure of similarity between the hand geometry of the user and a hand geometry in the model.

The providing the spectrogram into the model includes at least one of: using K-nearest neighbor (KNN) model; using support vector machine (SVM) model; using any other machine learning model; or using any other statistics model.

The receiving, by the computer, the information about the signature includes receiving the hand movement of the user. The receiving the hand movement of the user includes using a hand motion tracking algorithm by the computer to track the hand movement of the user. Additionally, the receiving the hand movement of the user includes extracting features from the hand movement of the user using a feature extraction algorithm, thereby producing extracted features. Moreover, the receiving the hand movement of the user includes providing the extracted features to the model. The comparing the information about the signature to the model to generate the score, wherein the score includes a measure of similarity between the hand geometry of the user and a hand geometry in the model.

The extracting the features from the hand movement of the user using the feature extraction algorithm includes extracting at least one of a velocity or acceleration of the hand movement of the user.

In some embodiments, the receiving, by the computer, the motion data about the information about the signature includes receiving the motion data about the information about the signature, wherein the motion data comprises at least one of rotation or acceleration. The receiving, by the computer, the motion data about the information about the signature additionally includes providing the motion data to the model.

In one or more embodiments, the receiving the motion data about the information about the signature includes receiving the motion data of a second hand of the user, wherein the second hand is different from a first hand, wherein the first hand is associated with a hand geometry of the user. The motion data includes at least one of rotation or acceleration. The score in the above is a measure of similarity between the motion data of the second hand movement of the user and a predetermined second hand movement in the model.

In at least one embodiment, the deciding, based on the score, if the information about the signature is within the predetermined tolerance level of the model includes providing three scores, where a first score of the three scores corresponds to a measure of similarity between a hand geometry of the user and a hand geometry in the model. A second score of the three scores corresponds to a measure of similarity between a hand movement of the user and a hand movement in the model. A third score of the three scores corresponds to a measure of similarity between the motion data of a second hand movement of the user and a predetermined second hand movement in the model.

In at least one embodiment, the deciding procedure includes obtaining a linear combination of the first score, the second score, and the third score, thereby producing a result. The deciding procedure further includes comparing the result to the predetermined tolerance level.

In at least one embodiment, the deciding procedure includes at least one of assessing conformation of authentication of the user by comparing the first score against a first threshold parameter; assessing conformation of authentication of the user by comparing the second score against a second threshold parameter; or assessing conformation of authentication of the user by comparing the third score against a third threshold parameter.

One of ordinary skilled in the art would recognize that the methodology described in the above example is programmed into a software architecture which is differentiated by various protocols, wherein each protocol is configured to execute a different method.

Example 2

A non-transitory computer-readable medium encoded with a computer-readable program which, when executed by a first processor, will cause a computer to execute a method of authenticating a user, the method including sending, by a computer, an acoustic signal. The method also includes receiving, by the computer, a reflected acoustic signal, wherein the reflected acoustic signal comprises information about a signature. Additionally, the method includes receiving, by the computer, motion data about the information about the signature. Further, the method includes comparing the information about the signature to a model to generate a score. Furthermore, the method includes deciding, based on the score, if the information about the signature is within a predetermined tolerance level. In some embodiments, the acoustic signal is higher than 17000 Hz.

In one or more embodiments, the training the plurality of models includes training a first model, wherein the first model corresponds to a means of authenticating a hand geometry of a user using an acoustic signal. Additionally, the training includes training a second model, wherein the second model corresponds to a means of authenticating a hand movement of the user using the acoustic signal. Further, the training includes training a third model, wherein the third model corresponds to a means of authenticating a hand movement of the user using motion data.

In at least one embodiment, the training the first model, where the first model corresponds to the means of authenticating the hand geometry of the user using the acoustic signal, includes collecting data related to the hand geometry from the user. Additionally, the training the first model includes transforming the data related to the hand geometry using a spectrogram. Moreover, the training the first model includes using the spectrogram to train the first model.

In one or more embodiments, the using the spectrogram to train the first model includes at least one of using K-nearest neighbor (KNN) model; using support vector machine (SVM) model; using any other machine learning model; or using any other statistics model.

In at least one embodiment, the training the second model, where the second model corresponds to the means of authenticating the hand movement of the user using the acoustic signal includes at least one of using multi-dimensional dynamic time warping; using any other machine learning model; or using any other statistics model.

In at least one embodiment, the training the third model, where the third model corresponds to the means of authenticating the hand movement of the user using the acoustic signal includes at least one of using multi-dimensional dynamic time warping; using any other machine learning model; or using any other statistics model.

In one or more embodiments, the information about the signature includes at least one of a hand geometry of the user; or a hand movement of the user.

In some embodiments, the receiving the information about the signature includes receiving the hand geometry of the user. The receiving the hand geometry of the user additionally includes transforming the information about the signature using a spectrogram. Further, the receiving the hand geometry of the user includes providing the spectrogram into the model.

In at least one embodiment, the providing the spectrogram into the model includes at least one of using K-nearest neighbor (KNN) model; using support vector machine (SVM) model; using any other machine learning model; or using any other statistics model.

In some embodiments, the receiving the information about the signature includes receiving the hand movement of the user. The receiving the hand movement of the user includes using a hand motion tracking algorithm by the computer to track the hand movement of the user. Additionally, the receiving the hand movement of the user includes extracting features from the hand movement of the user using a feature extraction algorithm, thereby producing extracted features. Furthermore, the receiving the hand movement of the user includes providing the extracted features to the model.

In at least one embodiment, the extracting the features from the hand movement of the user using the feature extraction algorithm includes extracting at least one of a velocity or acceleration of the hand movement of the user.

In various embodiments, a score includes a measure of similarity between the hand geometry of the user and a hand geometry in the model.

In some embodiments, the receiving, by the computer, the motion data about the information about the signature includes receiving the motion data about the information about the signature, wherein the motion data comprises at least one of rotation or acceleration. Additionally, the receiving includes providing the motion data to the model.

In at least one embodiment, the receiving the motion data about the information about the signature, where the motion data includes at least one of rotation or acceleration, includes receiving the motion data of a second hand of the user, wherein the second hand is different from a first hand, wherein the first hand is associated with a hand geometry of the user. Evaluating a score includes a measure of similarity between the motion data of the second hand movement of the user and a predetermined second hand movement in the model.

In at least one embodiment, the deciding, based on the score, if the information about the signature is within the predetermined tolerance level of the model includes providing three scores, wherein a first score of the three scores corresponds to a measure of similarity between a hand geometry of the user and a hand geometry in the model. A second score of the three scores corresponds to a measure of similarity between a hand movement of the user and a hand movement in the model. A third score of the three scores corresponds to a measure of similarity between the motion data of a second hand movement of the user and a predetermined second hand movement in the model.

In some embodiments, the deciding includes obtaining a linear combination of the first score, the second score, and the third score, thereby producing a result. The deciding further includes comparing the result to the predetermined tolerance level.

In some embodiments, the deciding includes at least one of assessing conformation of authentication of the user by comparing the first score against a first threshold parameter; assessing conformation of authentication of the user by comparing the second score against a second threshold parameter; or assessing conformation of authentication of the user by comparing the third score against a third threshold parameter.

One of ordinary skilled in the art would recognize that the methodology described in the above example is programmed into a software architecture which is differentiated by various protocols, wherein each discretized protocol is configured to execute a different method.

Example 3

FIG. 1 illustrates an overview of the system architecture, which includes two phases, i.e., user enrollment phase and user authentication phase. The designed system leverages two kinds of sensing modules: speaker and in-built microphones are used for acoustic sensing, while accelerometer and gyroscope sensors are used for motion sensing.

In the user enrollment step, each user is required to register his or her own signature for N times. During the registration process, earspeaker of smartphone emits pre-designed sound signals, which will be reflected back to the microphones on the smartphone. At the beginning of each registration, users are supposed to use one hand to hold the smartphone, and use another hand with its signing finger staying fixed for 1-2 seconds in front of the screen. This process will help our system to collect the echo signals and extract specific features of users' hand geometry. Then, each user should start registering their own signature. When his signing finger is moving, the system is able to use acoustic sensors to collect the echo signals and extract features of his or her finger trace.

Besides, when the user's one hand is signing, the other hand which is holding the phone will inevitably move slightly. Although this movement is not obvious, but its features are also possible to be captured and extracted by motion sensors. After the registration, the acoustic features of the finger trace, as well as the motion features are used to train the hand-geometry model as well as the in-air signature model, which will be used for the user authentication.

In the user authentication step, such system will compare the new signature with the training data, and calculate the dissimilarity between them. The new signature will be accepted if the result is less than a specific threshold. Otherwise the signature will be refused.

The software system architecture is divided into four different parts: design of sound signal, hand geometry phase, signature phase, and system framework. As for device selection, there are two speakers on a smartphone. One speaker is at the top, which is mainly used for phone calls, while the other is at the bottom as a supplement for better sound. Besides, there are also two microphones on a typical smartphone. The main one is at the bottom for phone calls, and the top one is used for noise cancellation.

Since the energy of sound signal from the bottom speaker will mainly transmit in the downward direction, but hardly reach the user's finger, the software system architecture only use the top speaker. Besides, both of the two in-built microphones are used since they are able to help calculate the accurate position of the user's finger.

Due to the hardware limitation and the uncertainty of sound signals, the sound wave design is extremely important to the final performance of the software system architecture. Several factors are considered in the design of sound wave: (1) The sound signal should be inaudible enough that it will not affect users' experience. The sound is hard to be heard when its frequency is higher than 17 kHz. On the other hand, the highest sampling rate on a smartphone is 48 kHz, which means that the highest frequency of the sound wave should not be greater than 24 kHz. Therefore, we choose 17-23 kHz as the frequency interval of our designed sound signal. (2) The hand geometry recognition phase and the signature authentication phase should use different frequency bands. This is because if they use the same band, when two users signing at almost the same time, one user's hand geometry phase will severely interfere with the other user's signing process. Therefore in our design, we assign 20-23 kHz for the hand geometry phase, and assign 17-19 kHz for the signature phase. Besides, other interference issues will be addressed in later collision detection part. (3) The length of the designed sound wave should be appropriate enough to make sure that the echo signal will not overlap with the transmitted signal.

According to the discussed factors, an illustrative example of the acoustic signals is illustrated in FIG. 1. We select 50 ms between hand geometry signal and in-air signature to make sure the echo signal will not overlap to each other. Objects create very weak echoes if the distance if over 6 meters. Thus the minimum delay is $$\frac{6 \text{ m} \times 2}{343 \text{ m/s}} = 35 \text{ ms}.$$

We give a bit buffer space and set it to be 50 ms. During the hand geometry phase, the speaker emits 20-23 Hz chirp waves in which frequency increases linearly with time. Its starting frequency $f_{start}$ is 20 kHz, while its final frequency fend is 23 kHz. During the signing phase, in order to avoid the collision between sound signals of two different signing processes, we choose a random frequency f from the range 17-19 kHz for the signature authentication. The details of collision detection will be discussed later. Note that a Hanning window is applied to reshape the emitted sound wave, in order to increase the SNR for echo signals in both the hand geometry and signature phases.

Figure 3A:
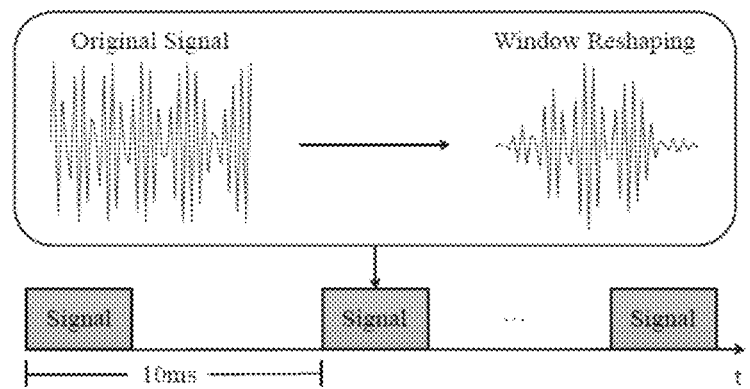
FIG. 3($a$) illustrates transmitter design in accordance with one or more embodiments.

Hand geometry phase: As introduced in the above parts, hand geometry phase is before the signature authentication. The design of the transmitted signal is in FIG. 3(a). A chirp wave with 20-23 kHz is emitted every 10 ms, while each chirp wave only last for 1 ms. This design is to make sure the transmitted wave will not overlap with the echo waves. During the hand geometry process, each user is asked to hold a smartphone for a short period of time with one of his fingers in front of the screen. Since the outline of hands and the length of fingers are quite different among users, we expect that the echo signals should have different features which can be extracted. In this part, an SVM-based classification model is trained to distinguish different people's hand geometry features.

Figure 3B:
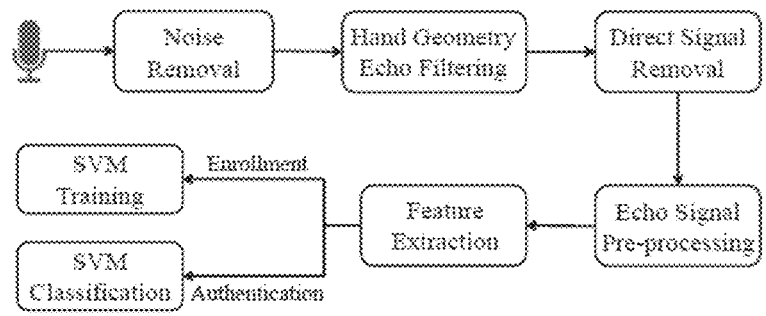

FIG. 3(b) illustrates the detailed design of the receiver. When the echo signals are received by the microphones, they should pass a Butterworth bandpass filter to remove background noise. This is because the power of reflected signals is too weak, and they will not be observed without the critical noise filtering step. We also need to remove the direct signal which is from the speaker to the microphone. This function is implemented by calculating the difference between the echo signal with the signing finger and without the finger.

Figure 4:
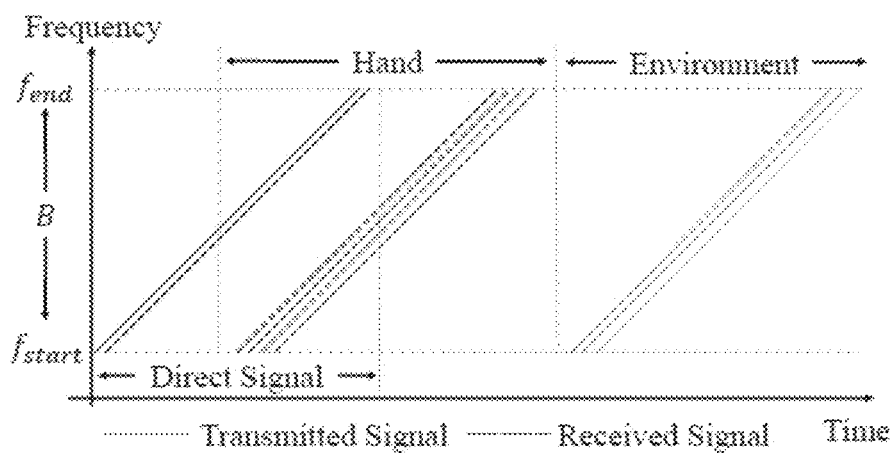
FIG. 4 illustrates relationship between time and frequency of transmitted signal and received signals, in accordance with one or more embodiments.

FIG. 4 illustrates the relationship between time and frequency of the transmitted signal and received signals. The proximal line represents the emitted signal, while different distal lines represent the echo signals of the direct path and multi paths. The thickness of the distal lines represents the power of the signals. After all of the processing steps, FIG. 5 is obtained, in which the echo signals from the user's hand and the environment are separated clearly.

For each hand geometry phase, we first draw the spectrograms of echo signals of different users by short-window FFT in FIG. 6, which is the illustrative spectrograms example of user 1, user 2, and user 3. Each user has two spectrograms. It is observed from FIG. 6 that the patterns of different users are apparent enough to be noticed by our eyes. In order to distinguish the spectrogram features of different users, an SVM classification model is used to classify the original user and the forged users. Specifically, we regard the original user's spectrograms as positive data of the training set, while use other users' spectrograms as negative data. Then one-class SVM with radial basis function (RBF) kernel is used for classification. When a new user comes, the SVM model will classify his hand geometry data into the original user's category or the forced user's category.

Signature phase: In the signature phase, both acoustic features and motion features are extracted, in order to jointly improve the accuracy of authentication process of the software system architecture. During the sound features extraction, at first we transmit a continuous wave signal of A cos 2π f t, where A is the amplitude and f is the frequency of the sound, ranging from 17-19 kHz. Due to the multipath effect of the user's finger, hand, and the environment, obtaining an accurate phase length change while user is signing in the air can be prohibitively challenging. Therefore, frequency diversity is going to be used to solve this problem. To measure the accurate path length change, we transmit the above continuous wave signal at 2 different frequencies $f_1$ and $f_2$ which is defined as $$\tfrac{1}{2} \cos 2\pi f_1 t + \tfrac{1}{2} \cos 2\pi f_2 t \qquad 5$$

where $f_1$ and $f_2$ are chosen from 17-19 kHz with step=200.

We use top and bottom in-built microphones on the same device to receive the sound signal. As the same procedure of hand geometry phase, the echo signal will also go through a Butterworth band pass filter at the beginning in order to remove the background noise. This step is essential especially for collecting signature data in some noisy environments.

After filtering the background noise, the signal is then split into two identical copies and multiplied by $\cos 2\pi ft$ and $-\sin 2\pi ft$. We then remove high frequency components and downsample the signal to get in-phase and quadrature components by using Cascaded Integrator Comb (CIC) filter. Same parameters of CIC filter are known to be selected. After obtaining in-phase and quadrature signals, path length change will be calculated through a Local Extreme Value Detection (LEVD) algorithm. Here, we set the threshold to be 0.1 times of the standard deviation of the baseband signal while hand or finger stays static before signing in the air.

After getting the path length change for each frequency, we combine all the results together by applying linear regression to achieve more accurate path length change for both top and bottom microphones, denoted as $d_{top}(t)$ and $d_{bot}(t)$. With $d_{top}(t)$ and $d_{bot}(t)$ that extracted from acoustic signal, we could extract more related features by using feature extractor method. We adopt a local-feature-based approach where the features were derived from each point along the online trace of a signature. The set of features that we used in our system are: 1) first order difference of $d_{top}(t)$ and $d_{bot}(t)$; 2) second order difference of $d_{top}(t)$ and $d_{bot}(t)$; 3) sine and cosine measures of $d_{top}(t)$ and $d_{bot}(t)$; 4) length-based features of $d_{top}(t)$ and $d_{bot}(t)$.

For $t=1, 2, \ldots, n-1$, there are different types of features that we can extract:

(1) First Order Differences:

$$\begin{cases} \Delta d_{top}(t) = d_{top}(t+1) - d_{top}(t) \\ \Delta d_{bot}(t) = d_{bot}(t+1) - d_{bot}(t) \end{cases}.$$

(2) Second Order Differences:

$$\begin{cases} \Delta^2 d_{top}(t) = d_{top}(t+1) - d_{top}(t) \\ \Delta^2 d_{bot}(t) = d_{bot}(t+1) - d_{bot}(t) \end{cases}.$$

(3) Sine and Cosine Features:

$$\begin{cases} \sin(t) = \dfrac{\Delta d_{bot}(t)}{\sqrt{(\Delta d_{top}(t))^2 + (\Delta d_{bot}(t))^2}} \\ \cos(t) = \dfrac{\Delta d_{top}(t)}{\sqrt{(\Delta d_{top}(t))^2 + (\Delta d_{bot}(t))^2}} \end{cases}.$$

(4) Length-Based Features:

$$\begin{cases} l(t) = \sqrt{(\Delta d_{top}(t))^2 + (\Delta d_{bot}(t))^2} \\ \Delta l(t) = \sqrt{(\Delta^2 d_{top}(t))^2 + (\Delta^2 d_{bot}(t))^2} \end{cases}.$$

We then obtain the following 10 features at the t-th time: $\{d_{top}(t), d_{bot}(t), \Delta d_{top}(t), \Delta d_{bot}(t), d_{top}(t), \Delta^2 d_{bot}(t), \sin(t), \cos(t), l(t), \Delta l(t)\}$ as extracted acoustic features from the signing signature.

Figure 7:
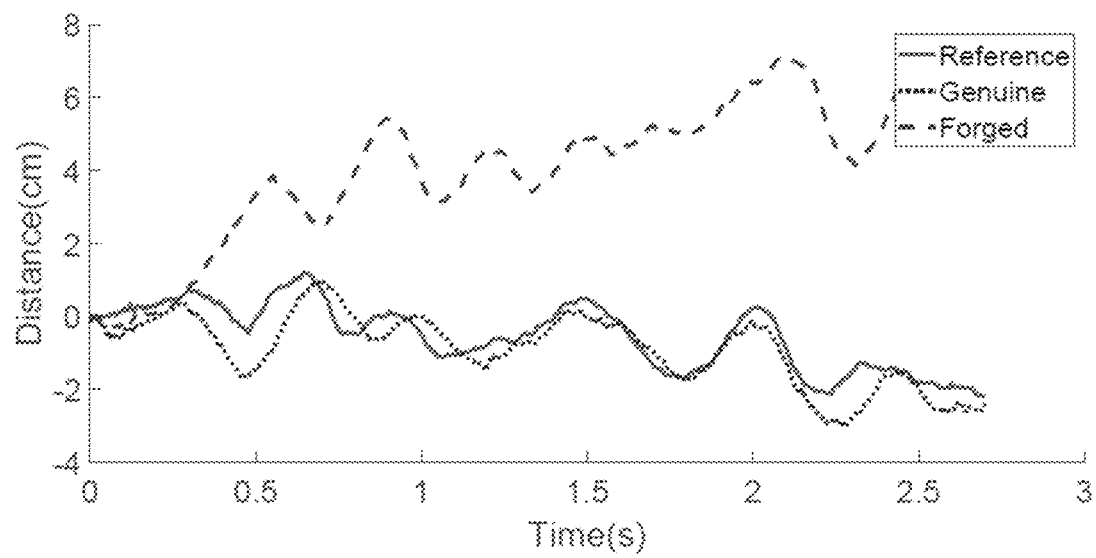
FIG. 7 illustrates a comparison of acoustic features of a registered, a genuine, and also a forged signature data.

In FIG. 7, we compare the acoustic features of the registered, the genuine, and also the forged signature data. It can be seen that, the genuine data is very similar to the reference one, while the forged data shows much difference.

As indicated in the system overview, when the user is using one hand to sign in the air, it is interesting to observe that his/her the other hand also moves slightly following a specific pattern with the movement of the signing hand. Moreover, different people may follow different patterns. Therefore, motion sensors such as accelerometer and gyroscope sensors of the mobile devices can be applied to capture the displacement and rotation of the device continuously for the holding hand while the user is signing. We find that the process is straightforward as the raw sensor data is directly used as part of our motion features. For each sensor, a time sequence of attributes such as x, y and z co-ordinates will be recorded. We represent the set of attributes for accelerometer and gyroscope sensors at t-th time by $\{Acc_x(t), Acc_y(t), Acc_z(t), G!yo_x(t), Gyro_y(t), Gyro_z(t)\}$. The first order differences of above attributes could also provide us more useful information. Therefore we regard them as additional features.

Figure 8A:
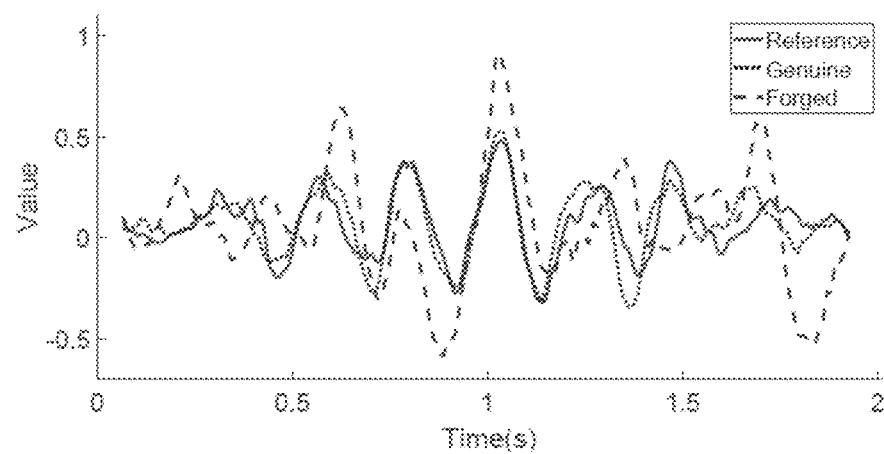
FIG. 8($a$) illustrates a comparison of a motion sensor's data among a registered, a genuine, and a forged signature data, using an accelerometer sensor.
Figure 8B:
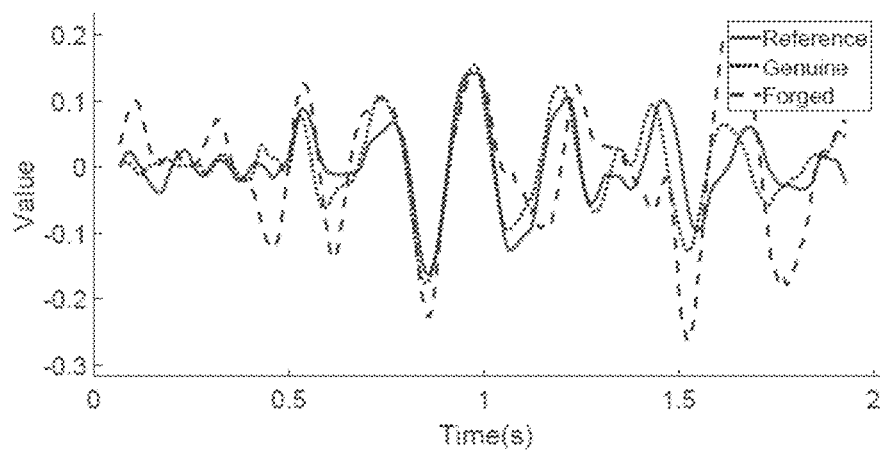

FIG. 8 illustrates an example of comparison of motion sensors' data among the registered, the genuine, and the forged signature data. FIG. 8(*a*) and FIG. 8(*b*) demonstrate the results of using accelerometer sensor and the gyroscope sensor respectively. From these figures, it can be seen that the forged signature is able to be distinguished from the original user's signature.

Dynamic time warping (DTW) method is a well-known technique to find an optimal alignment between two given sequences and the algorithm will return a DTW distance for each pair of sequences to determine the similarity. DTW method is used to compute the warping distance between the pair of sequences. Suppose that the input observation sequence is represented by w(i) where i=1, ..., m and the reference sequence by r(j) where j=1, ..., n. Then the distance D(i, j) in DTW method is defined as the minimum distance starting from the beginning of the DTW table to the current position (i, j):

$$D(i, j) = d(i, j) + \min \begin{cases} D(i-1, j) \\ D(i, j-1) \\ D(i-1, j-1) \end{cases} \qquad (1)$$

where d(i, j) is the distance matrix and can be defined as $d(i, j) = (w(i) - r(j))^2$.

Since DTW method only compares two sequences and finds the best path with the least global distance, we found a better method which is an extension of the original DTW-Multidimensional Dynamic Time Warping (MD-DTW). MD-DTW method is to calculate the DTW by synchronizing multi-dimensional series. In order to generalize the DTW method for multidimensional sequence alignment, the matrix distance will be calculated by using the vector norm between a pair of points. Here, w(k, i) now is the input series and r(k, j) is the reference series where k is the number of dimensions of one point, i=1, . . . , m and j=1, . . . , n. The matrix distance d(i, j) in MD-DTW is defined as $$d(i, j) = \sum_{k=1}^{K} (w(k, i) - r(k, j))^2$$

and the distance D(i, j) calculation will still follow Equation (1).

For our software system architecture, we implement MD-DTW method on the acoustic features and motion features as dimensions and calculated the least global distance for each pair of data samples. With this method, personalized threshold will be set up for each user to distinguish genuine signature data and forged signature data for each user.

When a new user comes, at first he/she should register his/her own signatures for N times. During each registration, when he/she is holding the phone with his/her finger on the screen for 1-2 seconds, the present software system architecture will emit sound signals and record the echo signals. The registered signals along with the prepared other people's signature data will be used to train an SVM classification model. When the registration part ends and the user is making the real signature, the present software system architecture will at first enter the hand geometry phase, which means the trained SVM model will at first compare whether his/her hand geometry is consistent with the registered ones. If the result is not consistent, the system will reduce the possibility of entering into the smartphone system. Otherwise the hand geometry data will be used to improve the system's recognition accuracy. After the hand geometry phase, the present software system architecture will go into the second phase, during which the acoustic features and motion features will be compared with the registered ones and the comparison result will be calculated. The new signature will be accepted if the result is lower than a particular threshold, otherwise the signature will be refused.

Until now, we have implemented most of the present software system architecture signature authentication system. However, since two users may be signing at the same time, if they are using the same frequency of sound signals coincidentally, their echo signals will interfere with each other, which will affect the signature authentication process of both users. Therefore, we design a frequency sensing and collision handling mechanism, in order to address the frequency collision problem.

Specifically, we borrow the method of carrier-sense multiple access with collision detection (CSMA/CD) in Ethernet technology to design this mechanism. As discussed previously during each user's signature process, the speaker on the smartphone should select two frequencies $f_1$ and $f_2$ and emit the corresponding signals. In our designed mechanism, before the speaker emits the signals, the microphone on the smartphone should also listen to the environment, and receive the echo signals of the whole frequency band, i.e., 17-19 kHz. We calculate the power spectral density (PSD) of the echo signals by a 512-sample FFT, and compare the PSD at $f_1$ and $f_2$ with a particular threshold, which is obtained by multiple experiments. If the result is larger than the threshold, we determine that there are other users using $f_1$ and $f_2$, and decide to randomly switch to another two frequencies $f_3$ and $f_4$ in 17-19 kHz, which are not used at the moment of transmitting sound signals.

For hand geometry system, for each user, we divide all his/her hand geometry data into two parts, 90% for model training and 10% for model testing. In order to evaluate our results more scientifically, cross validation method are being applied to the SVM classification method. Table 1 shows the confusion matrix for our hand geometry system after classification. To calculate the accuracy of binary classification, the F-score is being applied. F-score considers both the precision and the recall of the test data to compute the score. According to Table 1 below, the final F-score for our hand geometry system is $$2 \times \frac{precision * recall}{precision + recall} = 2 \times \frac{0.842 * 0.655}{0.842 + 0.655} = 0.745$$

TABLE 1

Confusion matrix for hand geometry system.

|  | Predict: Genuine | Predict: Forged |
| --- | --- | --- |
| Actual: Genuine | 1309 | 691 |
| Actual: Forged | 245 | 1755 |

For in-air signature system, we calculate the Equal Error Rate for above collected dataset. Equal Error Rate (EER) measures the system performance by finding the intersection between False Alarm Rate (FAR) and False Reject Rate (FRR).

Figure 9:
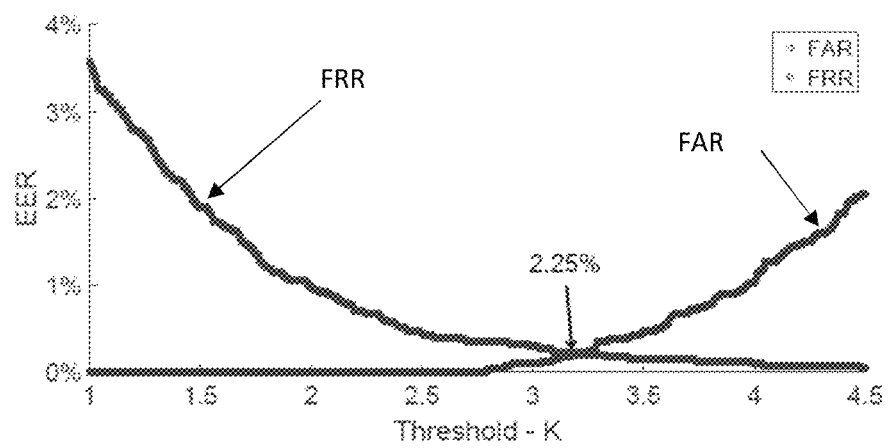
FIG. 9 illustrates equal error rate for in-air signature phase, in accordance with one or more embodiments.

As FIG. 9 illustrates, the final EER of our system for 30 participants is 2.25% by using both features extracted from acoustic and motion sensors.

Figure 10A:
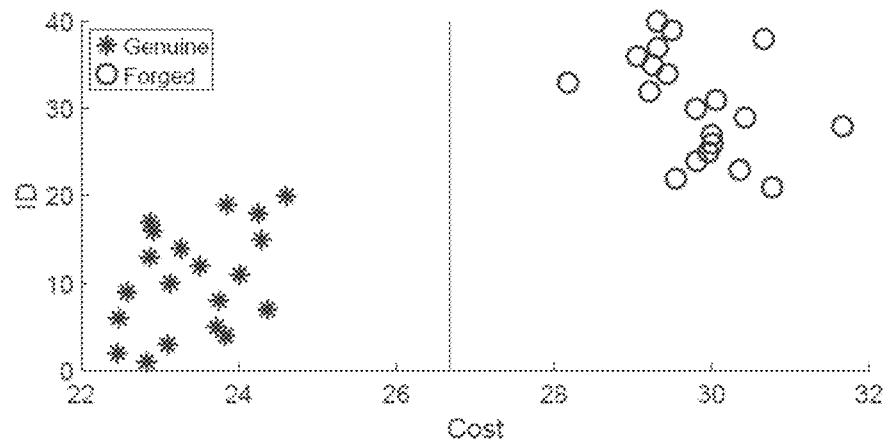
FIG. 10($a$) illustrates in-air signature classification for User 1.
Figure 10B:
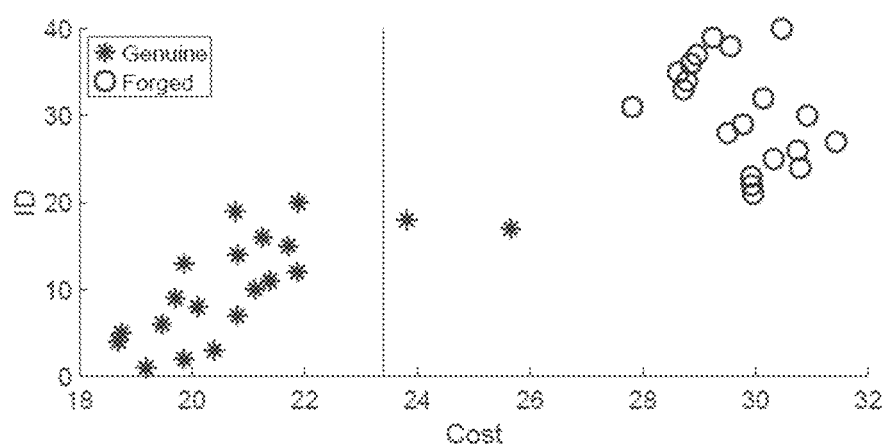

For each user, threshold is set up to be mean+k×std where mean and std are average and standard deviation of the distance costs from registered signature data respectively, and k is chosen from FIG. 9. In FIGS. 10(a) and 10(b), the genuine and forged signature data can be clearly classified into two separate groups for each user using above threshold.

Figure 11:
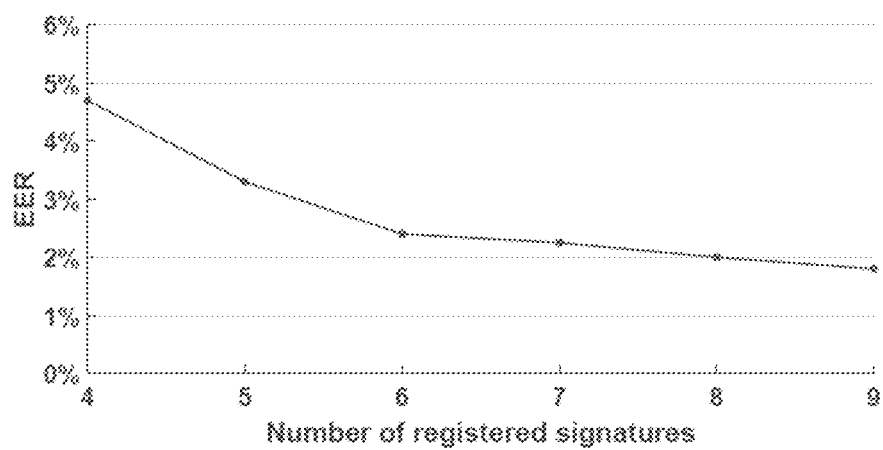
FIG. 11 illustrates equal error rate vs. number of registered signatures.

In FIG. 11, we have evaluated the Equal Error Rate (EER) of our proposed method under different numbers of registered signatures using above dataset. In this figure, we can see that when the number of registered signatures is small, the EER is relatively high. When more signatures are used for registration, we can achieve a lower EER. We can also see that when the number is equal to or greater than 7, the EER tends to be stable. In order to reduce the amount of calculations, we select 7 as the registration number for our system. By combining both systems together, we can achieve again 2.25% EER for our software system architecture.

We propose the present software system architecture which enables users to sign in the air for signature authentication. The system reconstructs 2D signature data and distinguishes hand geometry and in-air signature of each different users using acoustic and motion sensors. In addition, we use a frequency sensing and collision handling system to allow multiple users' to authenticate at the same time without interfering with each other. In order to evaluate our system, we collected 1410 genuine and forged signature data from 30 participants. We demonstrated that our system was able to verify genuine signature data and forged signature data with a high degree of accuracy—2.25% EER.

Figure 12:
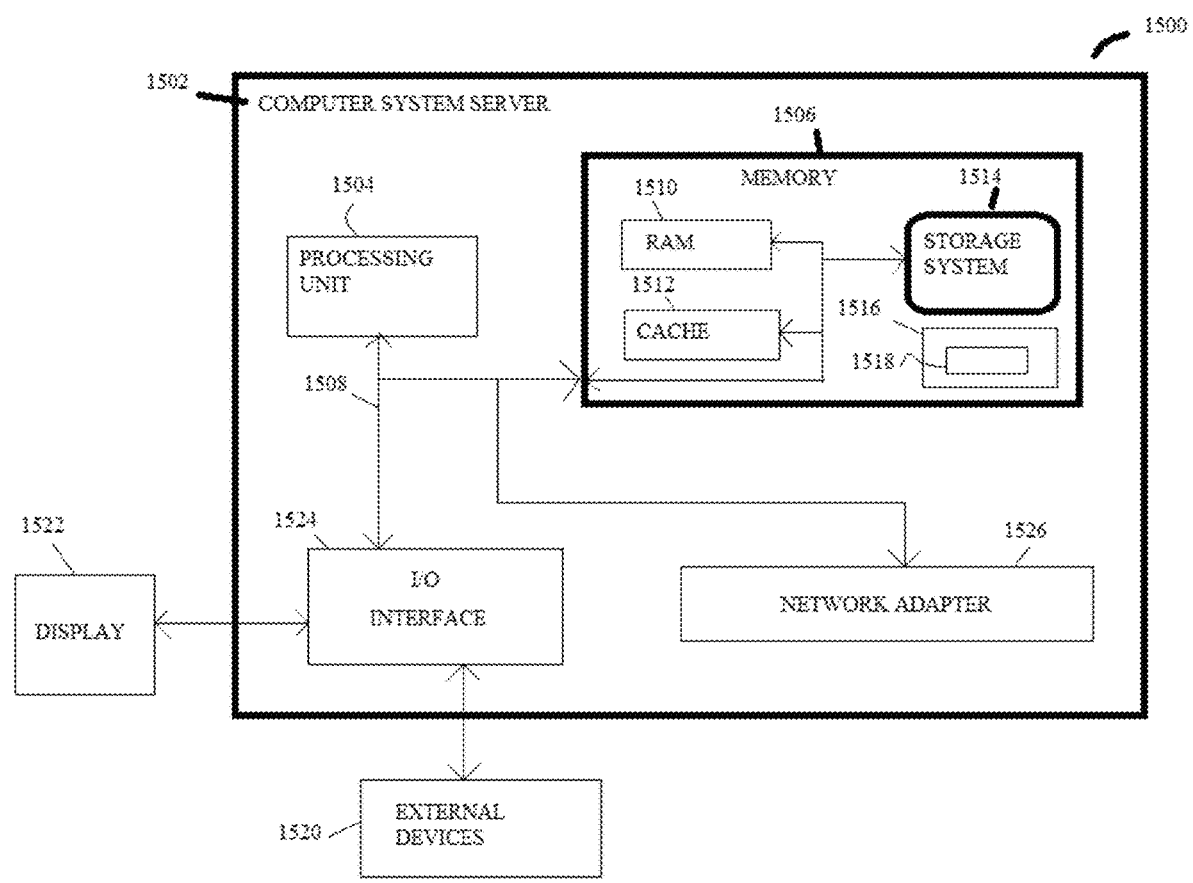
FIG. 12 illustrates one example of a computing or processing node 1200 for operating a method or a software architecture in accordance with the present application.

FIG. 12 illustrates one example of a computing or processing node 1500 for operating the methods and the software architecture of the present application. This is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the methods and the software architectures of the present application. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A non-transitory computer-readable medium encoded with a computer-readable program which, when executed by a first processor, will cause a computer to execute a method of authenticating a user, the method comprising:
   sending, by the computer, an acoustic signal;
   receiving, by the computer, a reflected acoustic signal, wherein the reflected acoustic signal comprises information about a signature;
   receiving, by the computer, motion data about the information about the signature;
   comparing the information about the signature to a model to generate a plurality scores, the plurality of scores comprising:
      a first score comprising a measure of similarity between a hand geometry of the user and a hand geometry in the model,
      a second score comprising a measure of similarity between a hand movement of the user and a hand movement in the model, and
      a third score comprising a measure of similarity between the motion data of a second hand movement of the user and a predetermined second hand movement in the model; and
   deciding, based on the plurality of scores, if the information about the signature is within a predetermined tolerance level.

2. The method of claim 1, wherein the acoustic signal is higher than 17000 Hz.

3. The method of claim 1, wherein the information about the signature comprises at least one of:
   the hand geometry of the user; or
   the hand movement of the user.

4. The method of claim 3, wherein the receiving, by the computer, the information about the signature comprises receiving the hand geometry of the user, comprises:
   transforming the information about the signature using a spectrogram; and
   providing the spectrogram into the model.

5. The method of claim 4, wherein the providing the spectrogram into the model comprises at least one of:
   using K-nearest neighbor (KNN) model;
   using support vector machine (SVM) model;
   using any other machine learning model; or
   using any other statistics model.

6. The method of claim 4, wherein the score comprises:
   a measure of similarity between the hand geometry of the user and a hand geometry in the model.

7. The method of claim 3, wherein the receiving the information about the signature comprises receiving the hand movement of the user, comprises:
   using a hand motion tracking algorithm by the computer to track the hand movement of the user;
   extracting features from the hand movement of the user using a feature extraction algorithm, thereby producing extracted features; and providing the extracted features to the model.

8. The method of claim 7, wherein the extracting the features from the hand movement of the user using the feature extraction algorithm comprises:
   extracting at least one of a velocity or acceleration of the hand movement of the user.

9. The method of claim 1, wherein the receiving, by the computer, the motion data about the information about the signature comprises:
   receiving the motion data about the information about the signature, wherein the motion data comprises at least one of rotation or acceleration; and
   providing the motion data to the model.

10. The method of claim 9, wherein the receiving the motion data about the information about the signature, wherein the motion data comprises at least one of rotation or acceleration comprises:
    receiving the motion data of a second hand of the user, wherein the second hand is different from a first hand, wherein the first hand is associated with the hand geometry of the user.

11. The method of claim 1, further comprising:
    obtaining a linear combination of the first score, the second score, and the third score, thereby producing a result; and
    comparing the result to the predetermined tolerance level.

12. The method of claim 1, further comprising at least one of:
    assessing conformation of authentication of the user by comparing the first score against a first threshold parameter;
    assessing conformation of authentication of the user by comparing the second score against a second threshold parameter; or
    assessing conformation of authentication of the user by comparing the third score against a third threshold parameter.

13. A non-transitory computer-readable medium encoded with a computer-readable program which, when executed by a first processor, will cause a computer to execute a method of authenticating a user, the method comprising:
    training a plurality of models;
    sending, by the computer, an acoustic signal; receiving, by the computer, a reflected acoustic signal, wherein the reflected acoustic signal comprises information about a signature;
    receiving, by the computer, motion data about the information about the signature;
    comparing the information about the signature to a model to generate a plurality of scores; and
    deciding, based on the plurality of scores, if the information about the signature is within a predetermined tolerance levels wherein the plurality of scores comprise:

a first score corresponding to a measure of similarity between a hand geometry of the user and a hand geometry in the model, a second score corresponding to a measure of similarity between a hand movement of the user and a hand movement in the model, and a third score corresponding to a measure of similarity between the motion data of a second hand movement of the user and a predetermined second hand movement in the model.

14. The method of claim 13, wherein the training the plurality of models comprises:

training a first model, wherein the first model corresponds to a means of authenticating a hand geometry of a user using the acoustic signal;

training a second model, wherein the second model corresponds to a means of authenticating the hand movement of the user using the acoustic signal; and training a third model, wherein the third model corresponds to a means of authenticating the hand movement of the user using motion data.

15. The method of claim 14, wherein the training the first model, wherein the first model corresponds to the means of authenticating the hand geometry of the user using the acoustic signal comprises:

collecting data related to the hand geometry from the user;

transforming the data related to the hand geometry using a spectrogram; and using the spectrogram to train the first model.

16. The method of claim 15, wherein the using the spectrogram to train the first model comprises at least one of:

using K-nearest neighbor (KNN) model;
using support vector machine (SVM) model;
using any other machine learning model; or
using any other statistics model.

17. The method of claim 14, wherein the training the second model, wherein the second model corresponds to the means of authenticating the hand movement of the user using the acoustic signal comprises at least one of:

using multi-dimensional dynamic time warping;
using any other machine learning model; or
using any other statistics model.

18. The method of claim 14, wherein the training the third model, wherein the third model corresponds to the means of authenticating the hand movement of the user using motion data comprises at least one of:

using multi-dimensional dynamic time warping;
using any other machine learning model; or
using any other statistics model.

19. The method of claim 13, wherein the acoustic signal is higher than 17000 Hz.

20. The method of claim 13, wherein the information about the signature comprises at least one of:

the hand geometry of the user; or
the hand movement of the user.

21. The method of claim 20, wherein the receiving the information about the signature comprises receiving the hand geometry of the user, comprises:

transforming the information about the signature using a spectrogram; and providing the spectrogram into the model.

22. The method of claim 21, wherein the providing the spectrogram into the model comprises at least one of:

using K-nearest neighbor (KNN) model;
using support vector machine (SVM) model;
using any other machine learning model; or
using any other statistics model.

23. The method of claim 20, wherein the receiving the information about the signature comprises receiving the hand movement of the user, comprises:

using a hand motion tracking algorithm by the computer to track the hand movement of the user;

extracting features from the hand movement of the user using a feature extraction algorithm, thereby producing extracted features; and providing the extracted features to the model.

24. The method of claim 23, wherein the extracting the features from the hand movement of the user using the feature extraction algorithm comprises:

extracting at least one of a velocity or acceleration of the hand movement of the user.

25. The method of claim 13, wherein the receiving, by the computer, the motion data about the information about the signature comprises:

receiving the motion data about the information about the signature, wherein the motion data comprises at least one of rotation or acceleration; and providing the motion data to the model.

26. The method of claim 25, wherein the receiving the motion data about the information about the signature, wherein the motion data comprises at least one of rotation or acceleration comprises:

receiving the motion data of a second hand of the user, wherein the second hand is different from a first hand, wherein the first hand is associated with the hand geometry of the user.

27. The method of claim 13, further comprising:

obtaining a linear combination of the first score, the second score, and the third score, thereby producing a result; and comparing the result to the predetermined tolerance level.

28. The method of claim 13, further comprising at least one of:

assessing conformation of authentication of the user by comparing the first score against a first threshold parameter;

assessing conformation of authentication of the user by comparing the second score against a second threshold parameter; or assessing conformation of authentication of the user by comparing the third score against a third threshold parameter.

* * * * *